(12) United States Patent
Sugasawa et al.

(10) Patent No.: US 10,404,102 B2
(45) Date of Patent: Sep. 3, 2019

(54) POWER FEEDING COIL UNIT, WIRELESS POWER FEEDING DEVICE AND WIRELESS POWER TRANSMISSION DEVICE

(71) Applicant: TDK CORPORATION, Tokyo (JP)

(72) Inventors: Masayuki Sugasawa, Tokyo (JP); Masayuki Kobayashi, Tokyo (JP); Noriyuki Fukushima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 149 days.

(21) Appl. No.: 15/472,696

(22) Filed: Mar. 29, 2017

(65) Prior Publication Data
US 2017/0288465 A1   Oct. 5, 2017

(30) Foreign Application Priority Data
Mar. 30, 2016   (JP) .................. 2016-067824

(51) Int. Cl.
| | | |
|---|---|---|
| *H01F 38/14* | (2006.01) | |
| *H02J 50/12* | (2016.01) | |
| *H01F 27/28* | (2006.01) | |
| *H02J 7/02* | (2016.01) | |
| *H01F 27/02* | (2006.01) | |
| *H01F 27/36* | (2006.01) | |
| *H02J 7/00* | (2006.01) | |
| *B60L 53/12* | (2019.01) | |

(52) U.S. Cl.
CPC .............. *H02J 50/12* (2016.02); *B60L 53/12* (2019.02); *H01F 27/02* (2013.01); *H01F 27/2823* (2013.01); *H01F 27/365* (2013.01); *H01F 38/14* (2013.01); *H02J 7/0042* (2013.01); *H02J 7/025* (2013.01)

(58) Field of Classification Search
CPC .......... H02J 50/12; H02J 7/0042; H02J 7/025; B60L 11/182; H01F 27/2823; H01F 27/02; H01F 38/14; H01F 27/365
See application file for complete search history.

(56) References Cited

U.S. PATENT DOCUMENTS 9,143,001 B2   9/2015 Nakayama
9,812,890 B1 *  11/2017 Leabman .............. H02J 7/0042
(Continued)

FOREIGN PATENT DOCUMENTS

| CN | 104170210 A | 11/2014 |
|---|---|---|
| JP | S62-076606 A | 4/1987 |

(Continued)

*Primary Examiner* — Alfonso Perez Borroto
*Assistant Examiner* — Esayas G Yeshaw
(74) *Attorney, Agent, or Firm* — Oliff PLC (57) ABSTRACT

A power feeding coil unit for wireless power transmission including a base portion with bottom having an opening on an upper end, a magnetic body having a plurality of magnetic plates disposed on a bottom surface of the base portion, a power feeding coil formed by winding a conductive wire on the magnetic body, a cover portion covering the opening of the base portion, and a rib extending from the base portion toward the cover portion between the plurality of magnetic plates and between the wires of the conductive wires, wherein, a distance between the rib and the cover portion is smaller than a distance between the power feeding coil and the cover portion.

14 Claims, 7 Drawing Sheets

(56) References Cited

U.S. PATENT DOCUMENTS

| | | | |
|---|---|---|---|
| 2009/0001941 A1* | 1/2009 | Hsu | H02J 7/0044 323/211 |
| 2010/0244582 A1* | 9/2010 | Yoshikawa | H02J 7/025 307/104 |
| 2010/0314946 A1* | 12/2010 | Budde | H02J 5/005 307/104 |
| 2012/0232836 A1* | 9/2012 | Ohmi | G06F 3/0304 702/150 |
| 2013/0264997 A1* | 10/2013 | Lee | H04B 5/0037 320/106 |
| 2014/0010319 A1* | 1/2014 | Baik | H04B 7/0413 375/267 |
| 2014/0035520 A1 | 2/2014 | Nakayama | |
| 2014/0191568 A1* | 7/2014 | Partovi | H02J 7/025 307/9.1 |
| 2015/0102664 A1 | 4/2015 | Tatsuta et al. | |

FOREIGN PATENT DOCUMENTS

| | | |
|---|---|---|
| JP | 2012-089618 A | 5/2012 |
| JP | 2014-023315 A | 2/2014 |

* cited by examiner

POWER FEEDING COIL UNIT, WIRELESS POWER FEEDING DEVICE AND WIRELESS POWER TRANSMISSION DEVICE

The present invention relates to a power feeding coil unit, a wireless power feeding device and a wireless power transmission device for wireless power transmission.

BACKGROUND

A wireless power transmission device is a technology for wirelessly supplying power from a power feeding coil to a power receiving coil by utilizing an electromagnetic induction or a resonance of a magnetic field between a power feeding coil (primary coil) and a power receiving coil (secondary coil). In this wireless power transmission device, a soft magnetic core with a high magnetic permeability is used to increase the magnetic coupling between the feeding and receiving coils and to improve the power transmission efficiency.

However, when the above described wireless power transmission device is applied to a power feeding apparatus of a vehicle or the like, the power feeding coil will be placed on the ground. At this time, when a vehicle tire or the like runs on the power feeding coil, a load is also applied to the soft magnetic core mounted on the power feeding coil, thus, the requirements on the technology for protecting the soft magnetic core is increased. For example, in Patent Document 1, a structure is proposed which has a cover portion and a base portion that are integrally formed (up and down), wherein, the cover portion and the base portion, each being made of resin concrete, form a storage space in the inner part, wherein, at least an inner cylinder wall, the primary coil, a magnetic core and a low-shrinkage resin was contained in the storage space, wherein, the low-shrinkage resin filled mainly in the space between the coil conductive wires of the primary coil.

PATENT DOCUMENTS

Patent Document 1: JP2012-89618A

SUMMARY

However, in the technique disclosed in Patent Document 1, the aim is to protect the core by the low-shrinkage resin filled mainly in the space between the coil conductive wires of the primary coil, but the stress dispersed through the low-shrinkage resin will be added to the core when a load is applied. As the core made by magnetic material is a brittle material, it is very weak against shock and load. Thereby, in Patent Document 1, the insufficient protection for the core is still a problem in the structure where stress is applied to the core as disclosed in Patent Document 1.

Herein, the present invention has been completed in view of the above problems, and aims to provide a power feeding coil unit, a wireless power feeding device and a wireless power transmission device which can certainly protect a magnetic body contained in the power feeding coil unit from a stress such as a load or the like.

The power feeding coil unit according to an embodiment of the present invention is a power feeding coil unit for wireless power transmission comprising a base portion with bottom having an opening on the upper end, a magnetic body having a plurality of magnetic plates disposed on the bottom surface of the base portion, a power feeding coil formed by winding a conductive wire on the magnetic body, a cover portion covering the opening of the base portion, and a rib extending from the base portion toward the cover portion between the plurality of magnetic plates and between the wires of the conductive wires, wherein, a distance between the rib and the cover portion is smaller than a distance between the power feeding coil and the cover portion.

According to the embodiment of the present invention, a rib extending from the base portion to the cover portion is provided between the plurality of magnetic plates and between the wires of the conducting wires, and the distance between the rib and the cover portion is smaller than the distance between the feeding coil and the cover portion. Therefore, a space is formed between the cover portion and the power feeding coil together with the magnetic body and thus no load will be applied to the magnetic body even when a load is applied to the power feeding coil unit. Thereby, it is possible to certainly protect a magnetic body contained in the power feeding coil unit from a stress such as a load or the like.

It is preferred that the power feeding coil has an opening portion in the center portion with a conductive wire wound to surround the opening portion, and the cover portion may be provided with a protruding portion protruding toward the opening portion. In this case, a space capable of containing electronic components or the like can be formed in the opening portion of the power feeding coil. Herein, the protruding portion of the cover portion on the opening portion has a large moment of inertia of area and it is difficult to generate a deflection by a load, thus, even if an electronic component or the like is contained in the space, a stress load due to the contact with the cover portion can be prevented.

It is preferred that one end of the rib is in contact with the cover portion. In this case, since the rib is in contact with the cover portion, when an external stress is applied to the cover portion, a deflection of the cover portion can be suppressed, and a stress load on the power feeding coil or the magnetic body can be certainly prevented, and further the magnetic body contained in the power feeding coil unit can be protected from a stress such as a load or the like more certainly.

The wireless power feeding device according to another embodiment of the present invention has the power feeding coil unit mentioned above. According to the embodiment of the present invention, it is possible to obtain a wireless power feeding device capable of certainly protecting the magnetic body contained in the power feeding coil unit from a stress such as a load or the like.

The wireless power transmission device according to another embodiment of the present invention has a wireless power feeding device and a wireless power receiving device wherein the wireless power feeding device is the wireless power feeding device mentioned above. According to the embodiment of the present invention, it is possible to obtain a wireless power transmission device capable of certainly protecting a magnetic body contained in a power feeding coil unit from a stress such as a load or the like.

According to some embodiments of the present invention, a magnetic body contained in a power feeding coil unit can be protected certainly from a stress such as a load or the like.

DETAILED DESCRIPTION OF EMBODIMENTS

Figure 1:
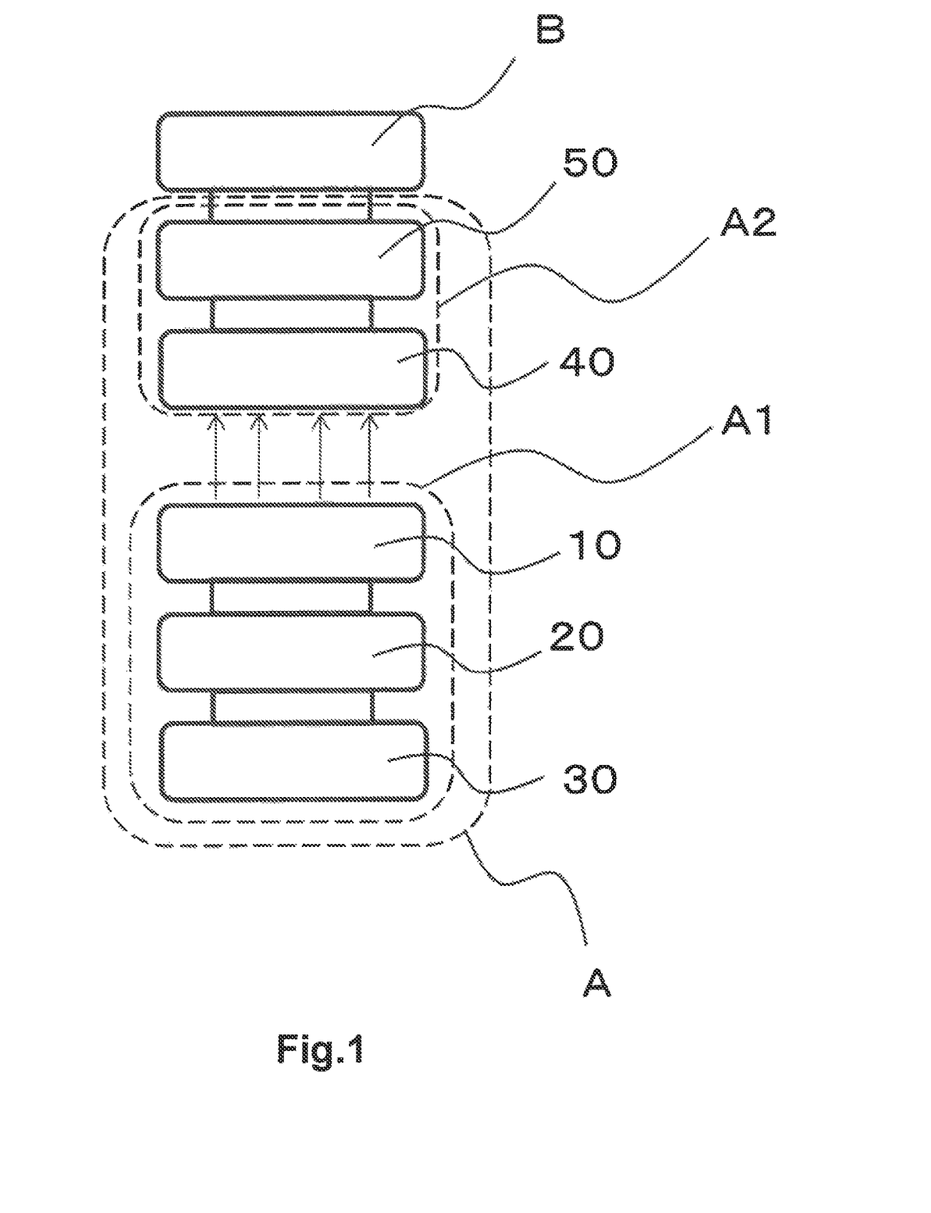
FIG. 1 is a schematic structure drawing showing a wireless power transmission device according to the first embodiment of the present invention together with a load.

Embodiments for executing the present invention will be described in detail with reference to the drawings. In the description, the same symbols or reference numerals will be attached to the same elements or the elements having the same functions, and repeated description will be omitted.
First Embodiment An entire structure of wireless power transmission device A according to the first embodiment of the present invention will be first described with reference to FIG. 1. FIG. 1 is a schematic structure drawing showing a wireless power transmission device according to the first embodiment of the present invention together with a load.

As shown in FIG. 1, wireless power transmission device A includes wireless power feeding device A1 and wireless power receiving device A2. Wireless power transmission device A according to the present embodiment can be applied to a charging apparatus for a vehicle. As the vehicles to which wireless power transmission device A can be applied, an electric vehicle using electric power of a secondary battery (BEV: battery electric vehicle), a hybrid electric vehicle (HEV), a plug-in hybrid electric vehicle (PHEV) and the like can be listed.

As shown in FIG. 1, wireless power feeding device A1 includes power source 30, inverter 20, and power feeding coil unit 10. As shown in FIG. 1, wireless power receiving device A2 includes power receiving coil unit 40 and rectifier portion 50.

Power source 30 supplies a direct current power to inverter 20 which will be described later. As power source 30, it is not particularly limited as long as it outputs direct current power, for example, a direct current power source which rectifies & smoothes a commercial alternating current power source, a secondary battery, a photovoltaic direct current power source, or a switching power source device such as a switching converter or the like can be listed.

Inverter 20 has a function of converting the input direct current electric power supplied from power source 30 into an alternating current electric power. In the present embodiment, inverter 20 converts the input direct current electric power supplied from power source 30 into an alternating current electric power and provides it to power feeding coil unit 10. As inverter 20, it is formed by a switching circuit in which a plurality of switching elements is bridge-connected. As the switching elements constituting the switching circuit, for example, elements such as a MOS-FET (Metal Oxide Semiconductor-Field Effect Transistor) or an IGBT (Insulated Gate Bipolar Transistor) or the like can be listed.

Power feeding coil unit 10 has a function of wirelessly transmitting the alternating current electric power supplied from inverter 20 to power receiving coil unit 40. That is, power feeding coil unit 10 is a coil unit for wireless power transmission. Power feeding coil unit 10 is disposed on the ground in the parking space where the vehicle is parked. For example, when power receiving coil unit 40 described later is mounted substantially at the lower center of the vehicle, power feeding coil unit 10 is disposed substantially at the center of the parking space; when power receiving coil unit 40 described later is disposed at the front lower portion or the rear lower portion of the vehicle, power feeding coil unit 10 is disposed on the side opposite to the entry beginning side of the vehicle in the parking space. The specific structure of power feeding coil unit 10 will be described later.

Power receiving coil unit 40 has a function of receiving alternating current power transmitted from power feeding coil unit 10. As power receiving coil unit 40, it includes at least a power receiving coil wound with a conductive wire of such as copper or aluminum or the like and is packaged in a housing having insulation property. Further, the conductive wire constituting the power receiving coil can be a single wire or a litz wire formed by twisting a plurality of fine conductive wires. Further, the number of turns of the power receiving coil can be appropriately set based on the separation distance between power receiving coil unit 40 and power feeding coil unit 10 or the desired power transmission efficiency or the like. Herein, power receiving coil unit 40 may be constituted only by the power receiving coil, or may be provided with a capacitor connected in series or parallel to the power receiving coil, or may be provided with a magnetic body for enhancing magnetic coupling between the coils, or may be provided with a conductive plate that absorbs electromagnetic waves. Power receiving coil unit 40 with such a structure is mounted on the lower part of the vehicle.

Rectifier portion 50 has a function of rectifying an alternating current power received by the power receiving coil unit 40 into a direct current power. As rectifier portion 50, a converter circuit, or the like, having a full-wave rectification function using a diode bridge and a power smoothing function using a capacitor and a three-terminal regulator can be listed. The direct current power rectified by rectifier portion 50 is output to the load B. Herein, as the load B, a secondary battery or a rotating machine provided in the vehicle can be listed. In addition, when the load B is an alternating current rotating machine, it is necessary to add an inverter (not shown) between rectifying unit 50 of wireless power receiving device A2 and the load B to provide an alternating current power to the alternating current rotating machine.

With such a structure, power feeding coil unit 10 of wireless power feeding device A1 and power receiving coil unit 40 of wireless power receiving device A2 are opposed to each other, thereby, wireless power transmission device A wirelessly transmitting power can be realized.

Figure 2:
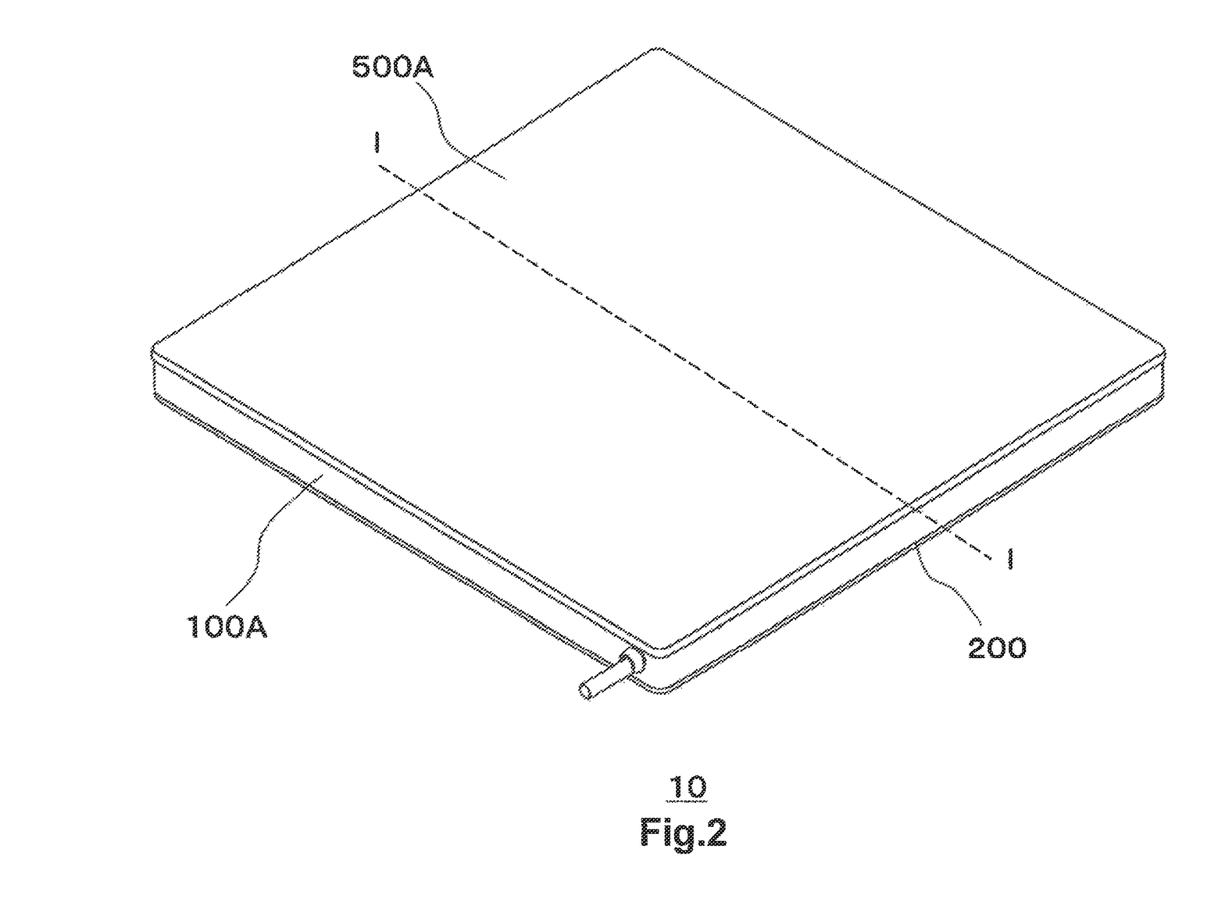
FIG. 2 is a perspective view of external appearance showing the structure of a power feeding coil unit in the wireless power transmission device according to the first embodiment of the present invention.
Figure 3:
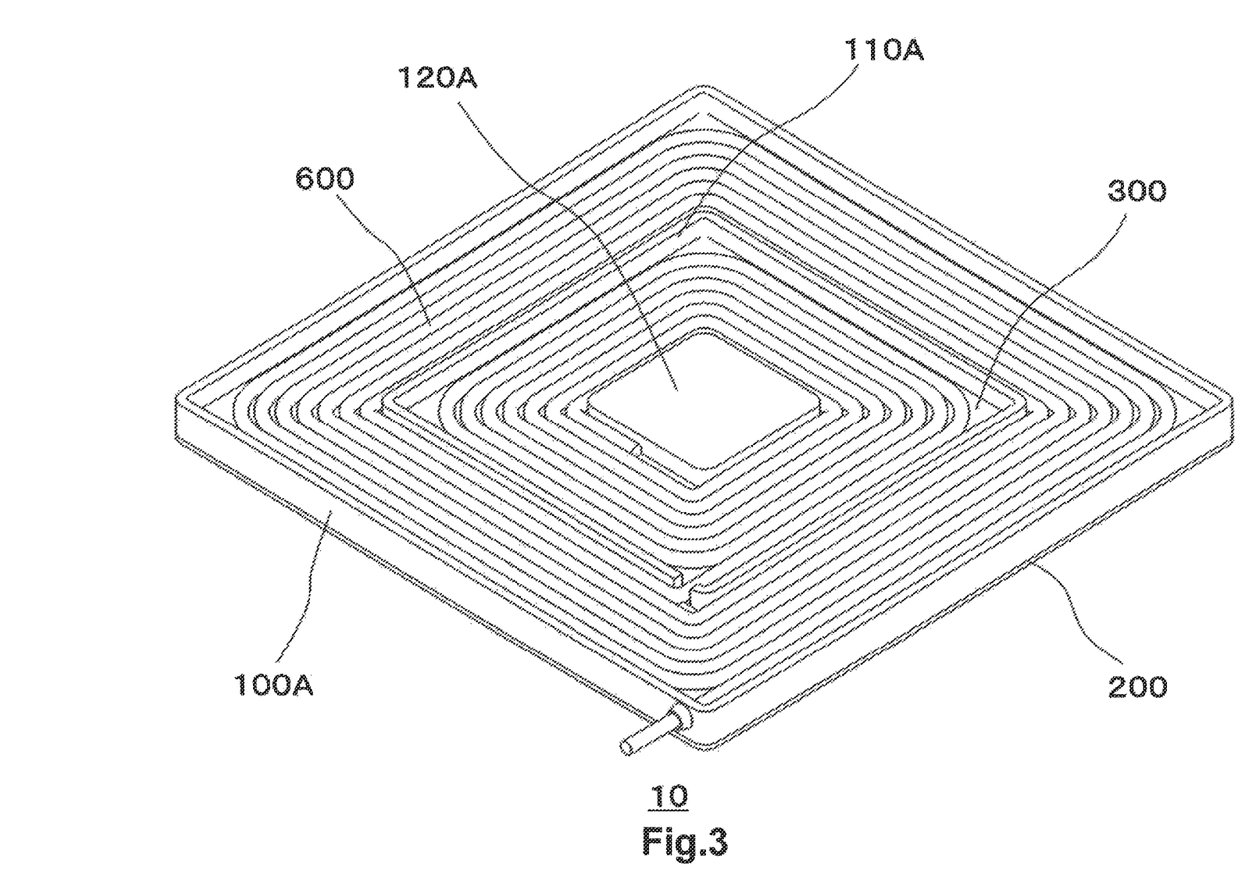
FIG. 3 is a perspective view showing the internal structure of a power feeding coil unit in the wireless power transmission device according to the first embodiment of the present invention.
Figure 4:
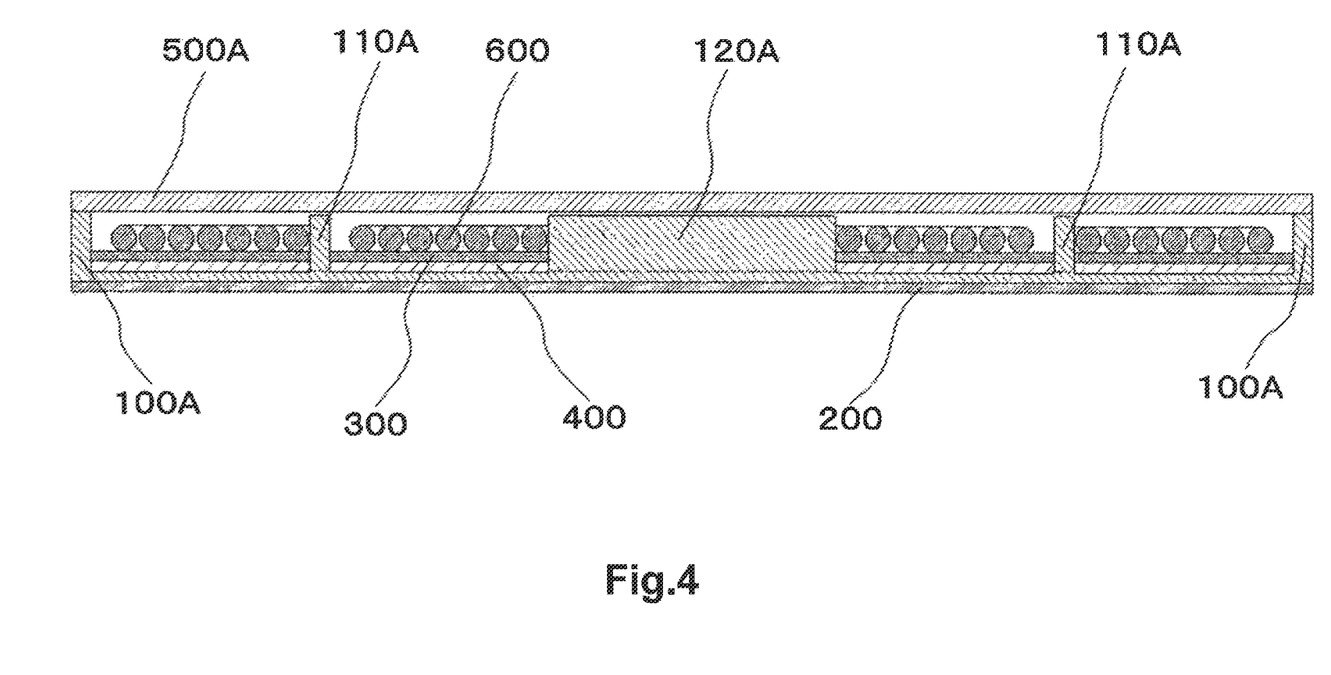
FIG. 4 is a cross-sectional view of a feeding coil unit along line I-I in FIG. 2.

Next, power feeding coil unit 10 in wireless power transmission device A according to the first embodiment of the present invention will be described in detail with reference to FIG. 2 to FIG. 4. FIG. 2 is an perspective view of external appearance showing the structure of a power feeding coil unit in the wireless power transmission device according to the first embodiment of the present invention. FIG. 3 is a perspective view showing the internal structure of a power feeding coil unit in the wireless power transmission device according to the first embodiment of the present invention. FIG. 4 is a cross-sectional view of a feeding coil unit along line I-I in FIG. 2.

As shown in FIG. 2 to FIG. 4, power feeding coil unit 10 includes base portion 100A, cover portion 500A, central convex portion 120A, rib 110A, shielding portion 200, insulator 300, magnetic body 400 and power feeding coil 600.

Base portion 100A is a member with bottom having an opening on the upper end. Specifically, base portion 100A has a flat bottom surface and side surfaces standing upright along the outer periphery of the bottom surface. A space to contain insulator 300, magnetic body 400, power feeding coil 600 and the like can be settled by the bottom surface and side surfaces. In the present embodiment, the bottom surface of base portion 100A is presented as a substantially square shape, but it is not limited to be like this, and it may be a substantially circular shape or a substantially rectangular shape. As a material of base portion 100A configured as mentioned above, it is preferable to be a plastic which is a nonmagnetic and nonconductive material, and more preferable to be a glass fiber reinforced plastic with an excellent load bearing performance. Further, wiring hole(s) for drawing out power feeding coil 600 is provided on a part of the side surfaces of base portion 100A Cover portion 500A is a member of a flat single plate. This cover portion 500A is disposed to cover the opening of base portion 100A. Specifically, the lower peripheral portion of cover portion 500A is placed on the upper end of the side surfaces of base portion 100A. In this way, base portion 100A and cover portion 500A serve as housings for containing components inside such as insulator 300, magnetic body 400, power feeding coil 600 and the like which are provided in the power feeding coil unit 10 and protecting them from the external environment. In the present embodiment, the main surface of cover portion 500A presents as a substantially square shape and is configured to have a size substantially equal to the bottom surface of base portion 100A. As a material of cover portion 500A configured as mentioned above, it is preferable to be a plastic which is a nonmagnetic and nonconductive material, and more preferable to be a glass fiber reinforced plastic with an excellent load bearing performance.

Central convex portion 120A is a member extends vertically upward from the bottom surface of base portion 100A. That is, central convex portion 120A extends from base portion 100A toward cover portion 500A. Specifically, central convex portion 120A is provided at the center portion on the bottom surface of base portion 100A, and is presented as a substantially cuboid shape. When observed from the opening of base portion 100A (i.e., observed from the opposing direction of base portion 100A and cover portion 500A), the upper end face of this central convex portion 120A is presented as a substantially square shape. In the present embodiment, the protrusion height of central convex portion 120A is set to be lower than the protrusion height of side surface of base portion 100A. Further, in the present embodiment, central convex portion 120A is integrally formed with the bottom surface of base portion 100A. This central convex portion 120A functions as a supporter when a load is applied to cover portion 500A. That is, it plays a role of improving the load bearing performance of power feeding coil unit 10. As a material of central convex portion 120A configured as mentioned above, it is preferable to be a plastic which is a nonmagnetic and nonconductive material, and more preferable to be a glass fiber reinforced plastic with an excellent load bearing performance.

Rib 110A is a member extending vertically upward from the bottom surface of base portion 100A. That is, rib 110A extends from base portion 100A toward cover portion 500A. Specifically, rib 110A is provided to divide the containing space in base portion 100A into an inner region and an outer region. Herein, in the present embodiment, the separation distance from rib 110A to central convex portion 120A and the separation distance from rib 110A to the side surfaces of base portion 100A are set to be substantially equal. When observed from the opening of base portion 100A (i.e., observed from the opposing direction of base portion 100A and cover portion 500A), rib 110A presents as a frame shape and a notch through which the conductive wire of power feeding coil 600 can pass is provided on a part of rib 110A. In the present embodiment, rib 110A is formed by one frame member dividing the containing space in base portion 100A into two regions, and it also may be formed by a plurality of frame members dividing the containing space in base portion 100A into three or more regions. Further, in the present embodiment, the protrusion height of rib 110A is set to be lower than the protrusion height of the side surfaces of base portion 100A and substantially equal to the protrusion height of central convex portion 120A. Further, in the present embodiment, rib 110A is provided integrally with the bottom surface of base portion 100A. As the material of rib 110A configured as mentioned above, it is preferable to be a plastic which is a nonmagnetic and nonconductive material, and more preferable to be a glass fiber reinforced plastic with an excellent load bearing performance.

Shielding portion 200 is flat member and is set to overlap the outer surface side of the bottom surface of base portion 100A. That is, when power feeding coil unit 10 is disposed on the ground in the parking space, shielding portion 200 will be a portion in contact with the ground. In the present embodiment, shielding portion 200 presents a substantially square shape and is configured to be substantially same size as the bottom surface of base portion 100A. This shield portion 200 has a function of shielding leakage of the magnetic flux generated by power feeding coil 600 to the outside (mainly to the ground side). As the material of shielding portion 200, there is no limit as long as it is a conductive material, for example, an aluminum alloy can be listed. Further, in the present embodiment, the bottom surface of base portion 100 and shielding portion 200 are formed with different materials respectively, but it is not limited thereto. The bottom surface of base portion 100A may be made of a conductive material and function as the shielding portion 200.

Insulator 300 is set to overlap the inner surface side of the bottom surface of base portion 100A. In the present embodiment, insulator 300 is provided with an insulating member disposed on the bottom surface in the inner region of base portion 100A and an insulating portion disposed on the bottom surface in the outer region of base portion 100A. That is, insulator 300 is divided into a plurality of parts by rib 110A. As the material of insulator 300 configured as mentioned above, an insulating resin can be listed.

Magnetic body 400 is set to overlap the insulator 300. In other words, magnetic body 400 is disposed on the bottom surface of base portion 100A via insulator 300. In the present embodiment, magnetic body 400 is provided with a plurality of magnetic plate comprising a magnetic plate disposed on the bottom surface in the inner region of base portion 100A via insulator 300 and a magnetic plate disposed on the bottom surface in the outer region of base portion 100A via insulator 300. That is, magnetic body 400 is divided into a plurality of parts by rib 110A. As the material of such magnetic body 400, ferrite, permalloy, silicon steel plate or the like can be listed. Further, the magnetic plates provided in the inner region or the outer region of base portion 100A may be composed of a single magnetic member or a plurality of magnetic body pieces, respectively.

Power feeding coil 600 is formed by winding a conductive wire on magnetic body 400. Specifically, power feeding coil 600 has a spiral structure in which an opening portion is provided at the center portion and a conductive wire is wound in a planar shape to surround the opening portion. In the present embodiment, power feeding coil 600 is disposed on magnetic body 400 in a manner that central convex portion 120A penetrates the opening portion. Therefore, power feeding coil 600 is formed by winding a conductive wire to surround central protrusion 120A. Further, power feeding coil 600 includes a winding portion on which a conductive wire is wound on the magnetic plate of magnetic body 400 set in the inner region of base portion 100A and a winding portion on which a conductive wire is wound on the magnetic plate of magnetic body 400 set in the outer region of base portion 100A. That is, power feeding coil 600 is divided into a plurality of parts by rib 110A. Further, the winding portion of power feeding coil 600 in the inner region of base portion 100A and the winding portion of power feeding coil 600 in the outer region of base portion 100A are connected via the notch of rib 100A. In other words, power feeding coil 600 is continuously wound from the inner region of base portion 100A toward the outer region of base portion 100A. As the material of the conductive wire of power feeding coil 600 configured as mentioned above, copper, aluminum, or the like can be listed. Since a high frequency alternating current flows in power feeding coil 600, it is preferred to use a litz wire formed by twisting a plurality of fine conductive wires together in consideration of the skin effect. Further, the insulation between power feeding coil 600 and magnetic body 400 may be ensured by interposing an insulating sheet between power feeding coil 600 and magnetic body 400, and also may be ensured by using a conductor with an insulating coating to form power feeding coil 600 itself. Further, although it is not shown in the present embodiment, power feeding coil unit 10 may be provided with a resonance capacitor that is connected in series or parallel to power feeding coil 600 to form a resonance circuit together with power feeding coil 600.

In the present embodiment, since magnetic body 400 and power feeding coil 600 are respectively set both in the inner region and the outer region of base part 100A, rib 110A extends from base portion 100A toward cover portion 500A between the plurality of magnetic plates of magnetic body 400 and between the conductive wires of power feeding coil 600. Further, in the present embodiment, the protrusion height of the side surfaces of base portion 100A, the protrusion height of rib 110A, and the protrusion height of the central protrusion 120A extend beyond the configuration height of power feeding coil 600. Therefore, the distance between rib 110A and cover portion 500A is smaller than the distance between power feeding coil 600 and cover portion 500A. Thereby, even if cover portion 500A is deflected due to the load applied by a vehicle when a tire of the vehicle runs on power feeding coil unit 10, the inner surface of cover portion 500A will contact with the upper end of rib 110A and the upper end of central convex portion 120A. Thereby, the stress due to the load received from the vehicle is not directly applied to magnetic body 400 or power feeding coil 600.

Herein, the effect of rib 110A of power feeding coil unit 10 according to the present embodiment will be described in detail. Usually, when a load is applied to cover portion 500A, cover portion 500A will deflect toward base portion 100A. At this time, although the deflection is suppressed by central convex portion 120A, cover portion 500A on the conductive wire of power feeding coil 600 tends to deflect when power feeding coil unit 10 contains magnetic body 400 having a plurality of flat plate magnetic plates and power feeding coil 600 formed by winding a conductive wire in a planar shape on the magnetic body 400. As in the present embodiment, the deflection of cover portion 500A on the conductive wire of power feeding coil 600 can be suppressed by providing rib 110A extending from base portion 100A toward cover portion 500A between the plurality of magnetic plates of magnetic body 400 and between the conductive wires of power feeding coil 600 in power feeding coil unit 10. That is, when a load is applied to cover portion 500A, the supporting length of the beam of cover portion 500A can be shortened by rib 110A, thus, the deflection amount of cover portion 500A can be reduced. Thereby, even if a load is applied to cover portion 500A, it is possible to prevent cover portion 500A from contacting power feeding coil 600. Therefore, the load applied to cover portion 500A will not be loaded on power feeding coil 600 and magnetic body 400.

As described above, in wireless power transmission device A according to the present embodiment, power feeding coil unit 10 includes: base portion 100A with bottom having an opening on the upper end, magnetic body 400 having a plurality of magnetic plates disposed on the bottom surface of base portion 100A; power feeding coil 600 formed by winding a conductive wire on magnetic body 400; cover portion 500A covering the opening of base portion 100A; rib 110A extending from base portion 100A toward cover portion 500A between the plurality of magnetic plates and between the conductive wires, wherein, the distance between rib 110A and cover portion 500A is smaller than the distance between power feeding coil 600 and cover portion 500A. Therefore, a space is formed between cover portion 500 and power feeding coil 600 together with magnetic body 400 and thus no load will be applied to magnetic body 400 even when a load is applied to power feeding coil unit 10. Thereby, it is possible to certainly protect magnetic body 400 contained in power feeding coil unit 10 from a stress such as a load or the like.

Second Embodiment

Figure 5:
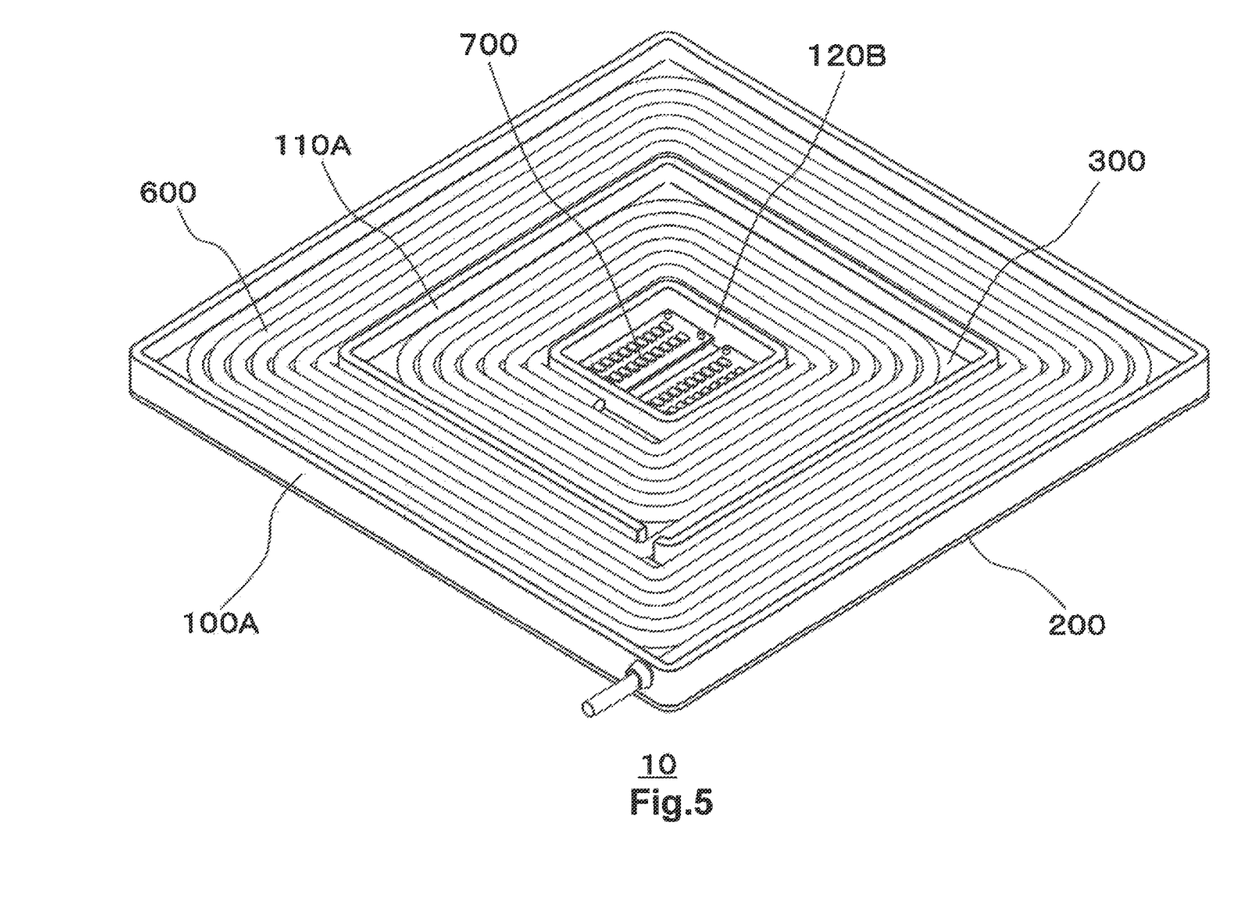
FIG. 5 is a perspective view showing the internal structure of a power feeding coil unit in the wireless power transmission device according to the second embodiment of the present invention.
Figure 6:
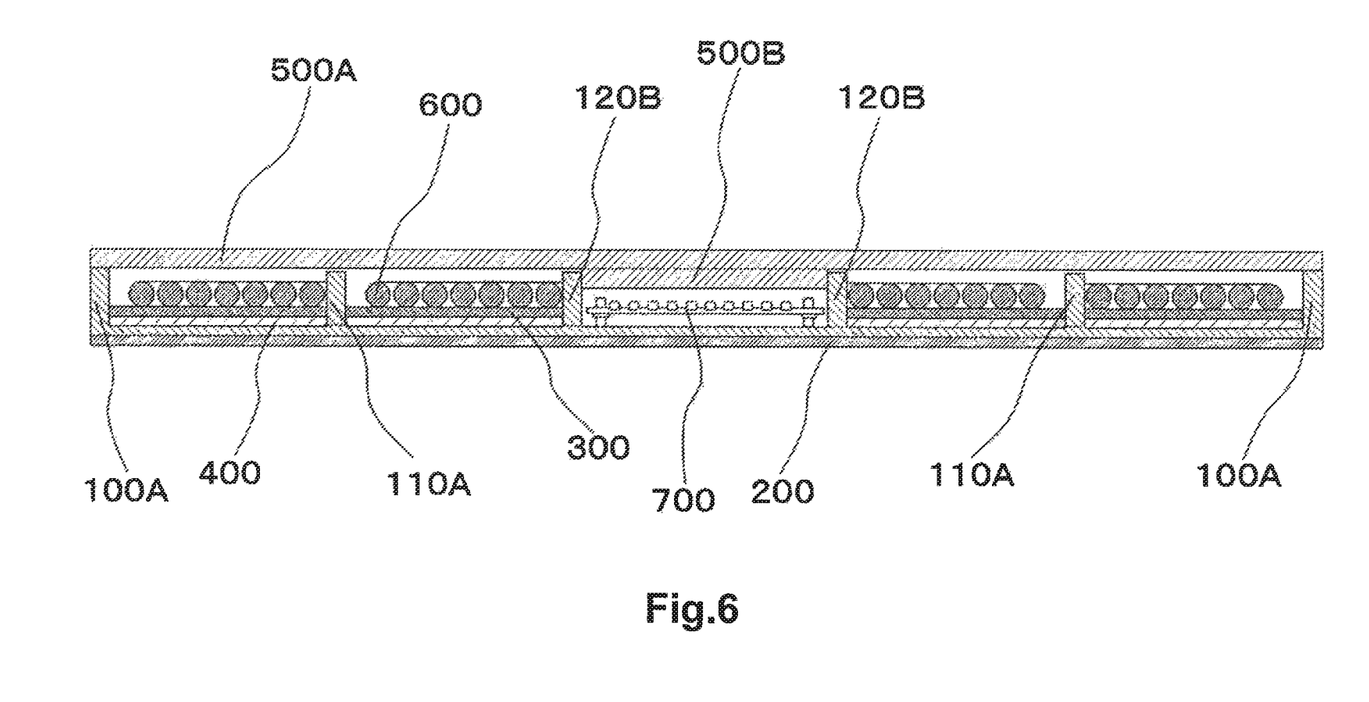
FIG. 6 is a cross-sectional view of a feeding coil unit according to the second embodiment of the present invention which corresponds to the cross-sectional view of the feeding coil unit according to the first embodiment of the present invention as shown in FIG. 4.

Next, a wireless power transmission device according to the second embodiment of the present invention will be described in detail with reference to FIG. 5 to FIG. 6. FIG. 5 is a perspective view showing the internal structure of a power feeding coil unit in the wireless power transmission device according to the second embodiment of the present invention. FIG. 6 is a cross-sectional view of a feeding coil unit according to the second embodiment of the present invention which corresponds to the cross-sectional view of the feeding coil unit according to the first embodiment of the present invention as shown in FIG. 4. In the wireless power transmission device according to the second embodiment of the present invention, central convex portion 120B is provided to replace central convex portion 120 A, and protruding portion 500B is provided for cover portion 500A in power feeding coil unit 10, except these two points different from that of the first embodiment, the other structure is the same as that of the first embodiment. In the following, the different points from the first embodiment are mainly described.

Similar to central convex portion 120A, central convex portion 120B is a member extending vertically upward from the bottom surface of base portion 100A. That is, central convex portion 120B extends from base portion 100A toward cover portion 500A. Specifically, central convex portion 120B is set to divide the containing space of base portion 100A into a center portion and an inner region. Thereby, in the present embodiment, the containing space in base portion 100A is divided into three regions of a center portion, an inner region and an outer region. Herein, similar to the first embodiment, power feeding coil 600 is a coil having a spiral structure in which an opening portion is provided at the center portion and a conductive wire is wound in a planar shape to surround the opening portion. When observed from the opening of base portion 100A (i.e., observed from the opposing direction of base portion 100A and cover portion 500A), central convex portion 120B presents as a frame shape and is set in a manner that central convex portion 120B penetrates the opening portion of power feeding coil 600. Thereby, a space capable of containing electronic component 700 surrounded by frame-shaped central convex portion 120B is formed in the center portion of base portion 100A which is the opening portion of power feeding coil 600. Herein, as electronic component 700 contained in the space, a resonance capacitor or the like connected in series or in parallel to power feeding coil 600 and forming a resonance circuit together with power feeding coil 600 may be listed. In the present embodiment, the protrusion height of central convex portion 120B is set to be lower than the protrusion height of the side surfaces of base portion 100A and substantially equal to the protrusion height of rib 110A. Further, in the present embodiment, central convex portion 120B is formed integrally with the bottom surface of base portion 100A. This central convex portion 120B functions as a support when a load is applied to cover portion 500A and also has a function of defining a space for containing electronic component 700 at the same time. As the material of central convex portion 120B configured as mentioned above, it is preferable to be a plastic which is a nonmagnetic and nonconductive material, and more preferable to be a glass fiber reinforced plastic with an excellent load bearing performance.

In the present embodiment, cover portion 500A is provided with protruding portion 500B. Protruding portion 500B is a portion extending vertically downward from the inner surface of cover portion 500A. That is, protruding portion 500B extends from cover portion 500A toward base portion 100A. Specifically, protruding portion 500B is provided at the center portion in the inner surface of cover portion 500A and faces the center portion surrounded by central convex portion 120B in the bottom surface of base portion 100A. That is, protruding portion 500B protrudes toward the opening portion of power feeding coil 600. Herein, the protrusion height extending from cover portion 500A of protruding portion 500B toward base portion 100A is set to ensure a space for containing electronic component 700 formed at the center portion of base portion 100A. When observed from a vertical direction (i.e., observed from the opposing direction of base portion 100A and cover portion 500A), the lower end face of this protruding portion 500B is presented as a substantially square shape. In the present embodiment, protruding portion 500B is formed integrally with the inner surface of cover portion 500A. As the material of protruding portion 500B configured as mentioned above, it is preferable to be a plastic which is a nonmagnetic and nonconductive material, and more preferable to be a glass fiber reinforced plastic with an excellent load bearing performance. Further, when the thickness of cover portion 500A is increased, it may be more difficult for deflection to occur due to a load. Thus, protruding portion 500B can be configured to protrude from the entire inner surface of cover portion 500A which faces opening portion of power feeding coil 600 toward base portion 100A from the viewpoint of improving the load bearing performance.

As described above, in the wireless power transmission device according to the present embodiment, in power feeding coil unit 10, the power feeding coil 600 has an opening portion in the center portion, and a conductive wire is wound to surround the opening portion. Cover portion 500A is provided with protruding portion 500B protruding toward the opening portion. Therefore, a space capable of containing electronic component 700 is formed in the opening portion of power feeding coil 600. Herein, protruding portion 500B of cover portion 500A on the opening portion has a large moment of inertia of area and it is difficult to generate a deflection due to a load, thus, even if electronic component 700 is contained in the space, a stress load due to the contact with cover portion 500A can be prevented.

Third Embodiment

Figure 7:
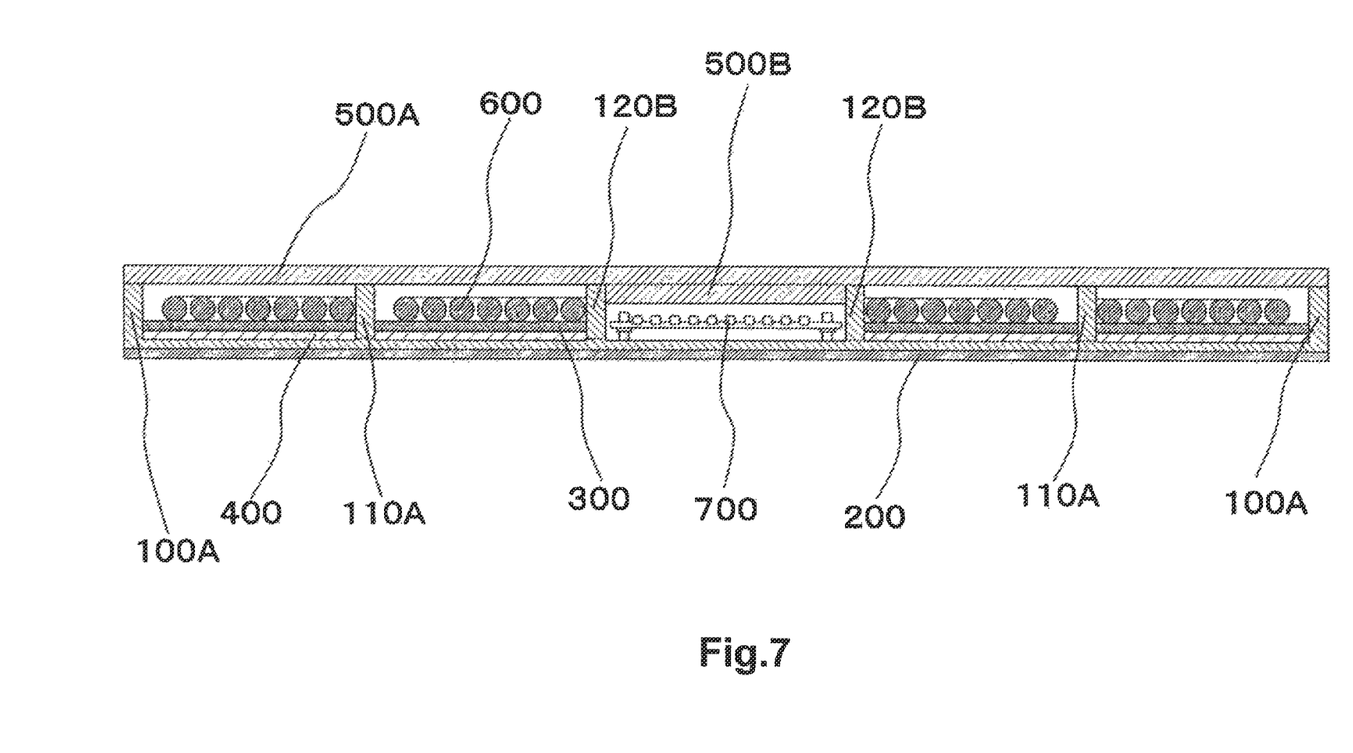
FIG. 7 is a cross-sectional view of a feeding coil unit according to the third embodiment of the present invention which corresponds to the cross-sectional view of the feeding coil unit according to the first embodiment of the present invention as shown in FIG. 4.

Next, a wireless power transmission device according to the third embodiment of the present invention will be described in detail with reference to FIG. 7. FIG. 7 is a cross-sectional view of a feeding coil unit according to the third embodiment of the present invention which corresponds to the cross-sectional view of the feeding coil unit according to the first embodiment of the present invention as shown in FIG. 4. In the wireless power transmission device according to the third embodiment of the present invention, in power feeding coil unit 10, it is different in the protrusion height of central convex portion 120B and the protrusion height of rib 110A from that of the second embodiment. The other structure is the same as that of the second embodiment except this difference. In the following, the different point from the first embodiment will be mainly described.

In the present embodiment, the protrusion height of central convex portion 120B is set to be substantially equal to the protrusion height of the side surfaces of base portion 100A. Therefore, the upper end (one end) of central convex portion 120B is in contact with cover portion 500A. Further, in the present embodiment, the protrusion height of rib 110A is set to be substantially equal to the protrusion height of the side surfaces of base portion 100A. Therefore, the upper end (one end) of rib 110A is in contact with cover portion 500A. Thereby, cover portion 500A is supported by the side surfaces of base portion 100A, central convex portion 120B and rib 110A.

As described above, in the wireless power transmission device according to the present embodiment, in power feeding coil unit 10, one end of the rib 110A is in contact with cover portion 500A. Therefore, since rib 110A is in contact with cover portion 500A, when an external stress is applied to cover portion 500A, a deflection of cover portion 500A can be suppressed, and a stress load on power feeding coil 600 or magnetic body 400 can be certainly prevented, and further magnetic body 400 contained in power feeding coil unit 10 can be protected from a stress such as a load or the like more certainly. Similarly, since one end of central convex portion 120B is also in contact with cover portion 500A, central convex portion 120B will play a role of suppressing the deflection of cover portion 500A when an external stress is applied to cover portion 500A.

Hereinabove, the present invention has been described based on the embodiments, but the present invention is not limited to the above-described embodiments, and various modifications and changes can be made. For example, the characteristic structure and the function of the wireless power transmission device according to the third embodiment described above may be applied to wireless power transmission device A according to the first embodiment. In this case, since rib 110A is in contact with cover portion 500A, when an external stress is applied to cover portion 500A, the deflection of cover portion 500A can be suppressed and a stress load on power feeding coil 600 or magnetic body 400 can be certainly prevented, and further magnetic body 400 contained in power feeding coil unit 10 can be protected from a stress such as a load or the like more certainly.

DESCRIPTION OF REFERENCE NUMERALS

A . . . wireless power transmission device
A1 . . . wireless power feeding device
A2 . . . wireless power receiving device
B . . . load
10 . . . power feeding coil unit
20 . . . inverter
30 . . . power source
40 . . . power receiving coil unit
50 . . . rectifier portion
100A . . . base portion
110A . . . rib
120A, 120B . . . central convex portion
200 . . . shielding portion
300 . . . insulator
400 . . . magnetic body
500A . . . cover portion
500B . . . protruding portion
600 . . . power feeding coil
700 . . . electronic component

What is claimed is:

1. A power feeding coil unit for wireless power transmission, comprising:
a base portion with bottom having an opening on an upper end,
a magnetic body having a plurality of magnetic plates disposed on a bottom surface of the base portion,
a power feeding coil formed by winding a conductive wire on the magnetic body,
a cover portion covering the opening of the base portion, and
a rib extending from the bottom of the base portion toward the cover portion between the plurality of magnetic plates and between wire portions of the conductive wire,
wherein, a distance between the rib and the cover portion is smaller than a distance between the power feeding coil and the cover portion.

2. The power feeding coil unit according to claim 1, wherein,
the power feeding coil has an opening portion in the center portion with a conductive wire wound to surround the opening portion,
and the cover portion comprises a protruding portion protruding toward the opening portion.

3. The power feeding coil unit according to claim 1, wherein,
one end of the rib is in contact with the cover portion.

4. The power feeding coil unit according to claim 2, wherein,
one end of the rib is in contact with the cover portion.

5. A wireless power feeding device comprising the power feeding coil unit according to claim 1.

6. A wireless power feeding device comprising the power feeding coil unit according to claim 2.

7. A wireless power feeding device comprising the power feeding coil unit according to claim 3.

8. A wireless power feeding device comprising the power feeding coil unit according to claim 4.

9. A wireless power transmission device comprising a wireless power feeding device and a wireless power receiving device, wherein,
the wireless power feeding device is the wireless power feeding device according to claim 5.

10. A wireless power transmission device comprising a wireless power feeding device and a wireless power receiving device, wherein,
the wireless power feeding device is the wireless power feeding device according to claim 6.

11. A wireless power transmission device comprising a wireless power feeding device and a wireless power receiving device, wherein,
the wireless power feeding device is the wireless power feeding device according to claim 7.

12. A wireless power transmission device comprising a wireless power feeding device and a wireless power receiving device, wherein,
the wireless power feeding device is the wireless power feeding device according to claim 8.

13. The power feeding coil unit according to claim 1, further comprising:
a central convex portion located on a central part of the base portion,
wherein the rib is arranged such that at least one magnetic plate of the plurality of magnetic plates is located in an inner region of the base portion between the central convex portion and the rib, and at least another magnetic plate of plurality of magnetic plates is located in an outer region of the base portion outside both the central convex portion and the rib.

14. The power feeding coil unit according to claim 13, wherein at least one of the wire portions is located in the inner region and at least another of the wire portions is located in the outer region.

* * * * *